United States Patent
Syren

(10) Patent No.: US 10,195,554 B1
(45) Date of Patent: Feb. 5, 2019

(54) OIL FILTER MOUNTING ADAPTER

(71) Applicant: Donald Edward Syren, Manchester, IA (US)

(72) Inventor: Donald Edward Syren, Manchester, IA (US)

( * ) Notice: Subject to any disclaimer, the term of this patent is extended or adjusted under 35 U.S.C. 154(b) by 0 days.

(21) Appl. No.: 15/929,017

(22) Filed: May 22, 2018

Related U.S. Application Data

(60) Provisional application No. 62/603,961, filed on Jun. 19, 2017.

(51) Int. Cl.
*B01D 35/30* (2006.01)
*F01M 11/03* (2006.01)

(52) U.S. Cl.
CPC ........... *B01D 35/306* (2013.01); *F01M 11/03* (2013.01); *B01D 2201/4023* (2013.01); *F01M 2011/031* (2013.01)

(58) Field of Classification Search
None
See application file for complete search history.

(56) References Cited

U.S. PATENT DOCUMENTS

| 4,222,875 A * | 9/1980 | Sikula, Jr. | B01D 35/15 123/196 R |
| 4,626,344 A * | 12/1986 | Fick | B01D 35/143 116/70 |
| 5,230,795 A * | 7/1993 | Yang | B01D 27/08 210/236 |

* cited by examiner

*Primary Examiner* — Benjamin M Kurtz
(74) *Attorney, Agent, or Firm* — Kintner IP, LLC; Mary Frances Ludwig

(57) ABSTRACT

An oil filter mounting adapter includes a nipple for connecting an oil filter and a camrod engaged with the nipple. Rotation of the camrod produces a translation of the nipple which draws the oil filter toward a face of the adapter and seals the filter against the adapter. Rotation of the camrod requires only low torque, which simplifies removal and replacement of the oil filter. In embodiments, the camrod is positionable in a location which is easily accessible to the user. Embodiments include a detent which restricts motion of the camrod, and which may be released by hand.

18 Claims, 6 Drawing Sheets

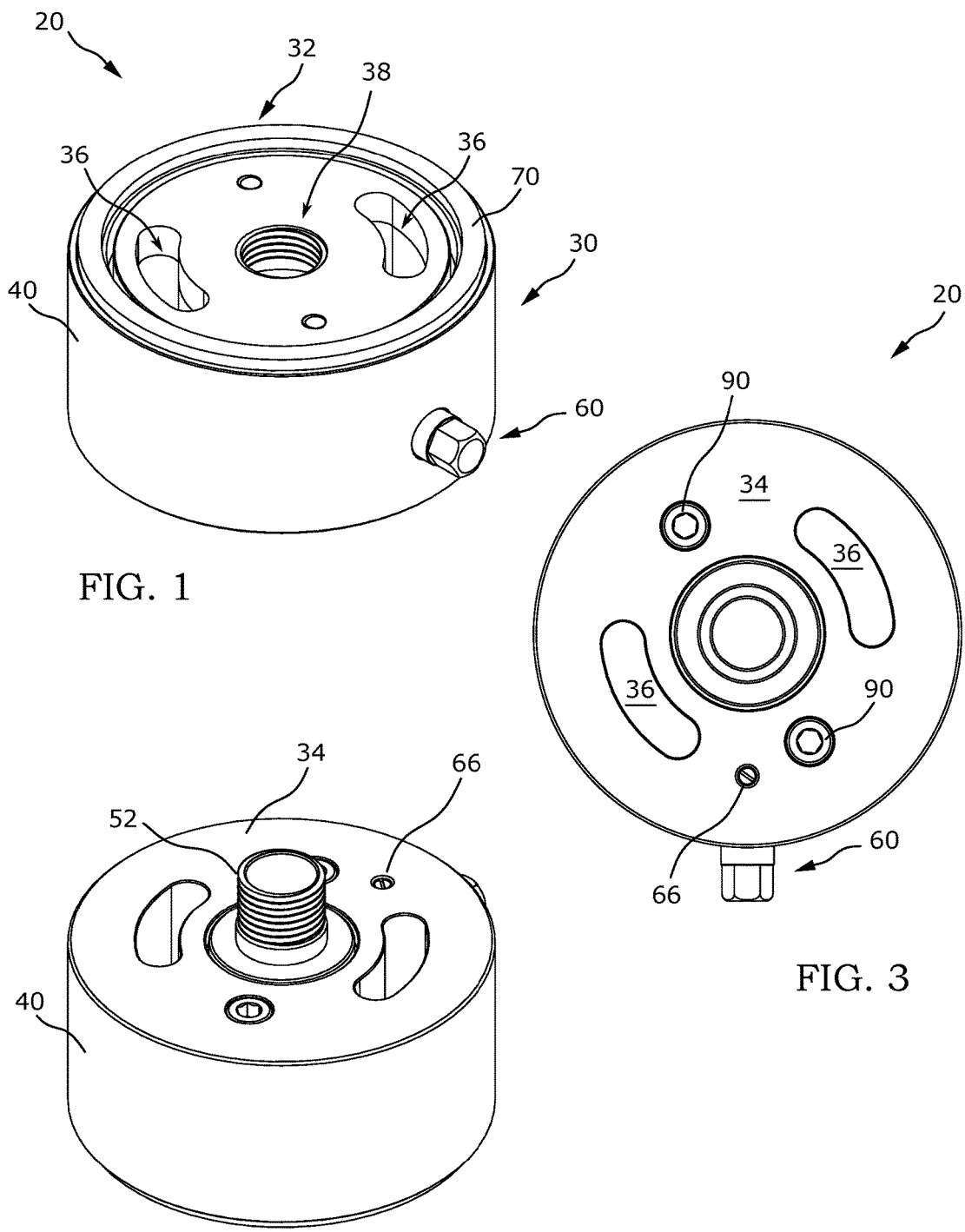

ized substantially perpendicular to the proximal and distal faces; and, a sidewall. A nipple is located and slidably positionable within the central bore, and has a nipple end configured to extend beyond the distal face of the adapter
OIL FILTER MOUNTING ADAPTER

CROSS REFERENCE TO RELATED APPLICATION

This application claims the filing benefit under 35 U.S.C. § 119(e) of U.S. Provisional Application No. 62/603,961, filed 19 Jun. 2017, which is hereby incorporated by reference.

TECHNICAL FIELD

The present invention pertains generally to mounts for fluid filters, and more particularly to an oil filter mounting adapter with a release mechanism including a camrod.

BACKGROUND OF THE INVENTION

Engine oil filters of the common spin-on type are typically threaded directly onto a mounting boss of an engine block and tightened to form a seal. To remove the filter, the seal must be broken which requires the application of considerable torque using a filter wrench or similar tool. Accessing the oil filter for installation or removal with a tool may be difficult due to space constraints. In addition, the oil filter may be damaged during an attempted removal, increasing the difficulty of the process.

Adapters for mounting oil filters include sandwich adapters, which may allow connection with sensors or cooling kits. Offset-type adapters allow mounting the filter at some location remote from the engine. These adapters commonly include a thread for directly mounting and sealing the filter, and do not address the aforementioned difficulties with the filter installation and removal.

There is therefore a need in the art for an oil filter mounting adapter which simplifies the installation and removal of an engine oil filter.

BRIEF SUMMARY OF THE INVENTION

The present invention is directed to an oil filter mounting adapter which simplifies removal and replacement of an engine oil filter. The mounting adapter includes a nipple to which an oil filter may be connected. A camrod is engaged with the nipple, and rotation of the camrod creates a translation of the nipple which draws the oil filter toward a face of the adapter. The oil filter may be attached to or removed from the nipple by hand, without the use of a filter wrench or other tools. Operation of the camrod release mechanism requires only low torque, and may be performed single-handedly with a small tool. In embodiments, the camrod is positionable in a location which is easily accessible to the user.

In accordance with an embodiment, a mounting adapter is configured for connecting an oil filter having a plurality of oil flow apertures in a mounting end, to an oil filter mounting boss of an engine block. The mounting adapter includes an adapter body having: a proximal face configured to couple to the oil filter mounting boss; a distal face configured to contact the mounting end of the oil filter; a plurality of channels each extending between and opening to the proximal face and the distal face, and positioned for fluid communication with one of the oil flow apertures; a central bore oriented substantially perpendicular to the proximal and distal faces; and, a sidewall. A nipple is located and slidably positionable within the central bore, and has a nipple end configured to extend beyond the distal face of the adapter body and matingly connect to the mounting end of the oil filter. The mounting adapter further includes a camrod which has an eccentric coupling end. A through hole in the sidewall of the adapter body has a longitudinal axis oriented substantially parallel to the proximal and distal faces, and opens to the central bore. The through hole is shaped and dimensioned to receive the camrod. A coupling hole in the nipple is dimensioned to receive the coupling end of the camrod. The camrod is located in the through hole with the coupling end engaged with the coupling hole of the nipple, and the camrod is rotatable generally about the longitudinal axis of the through hole such that rotation of the camrod produces a translation of the nipple within the central bore.

In accordance with another embodiment, the adapter body is configured to sealingly couple directly to the oil filter mounting boss.

In accordance with another embodiment, the adapter body includes a mounting plate located at the proximal face and configured to couple to the oil filter mounting boss. The mounting plate is retained by a fastener, and the fastener is adjustable through the distal face.

In accordance with another embodiment, the proximal face of the adapter body has an internally threaded region configured for threadable engagement with the oil filter mounting boss.

In accordance with another embodiment, the camrod has a circumferential groove. A detent is mounted in the adapter body and configured to engage with the circumferential groove, thereby restricting motion of the camrod.

In accordance with another embodiment, a plurality of asymmetrical notches are spaced circumferentially about the camrod. A detent is mounted to the adapter body and configured to engage with one of the plurality of asymmetrical notches, thereby restricting motion of the camrod. In accordance with another embodiment, the detent includes a release located external to the sidewall of the adapter body.

In accordance with another embodiment, the nipple end has an external thread configured for threadable engagement with the mounting end of the oil filter.

In accordance with another embodiment, a 180 degree rotation of the camrod produces a translation of the nipple equal to about a single thread spacing of the external thread of the nipple end.

Other embodiments, in addition to the embodiments enumerated above, will become apparent from the following detailed description, taken in conjunction with the accompanying drawings, which illustrate, by way of example, the principles of the oil filter mounting adapter and method of use.

BRIEF DESCRIPTION OF THE DRAWINGS

FIG. 1 is a front perspective view of an oil filter mounting adapter.

FIG. 2 is a rear perspective view of the mounting adapter.

FIG. 3 is a bottom plan view of the mounting adapter.

Figure 4:
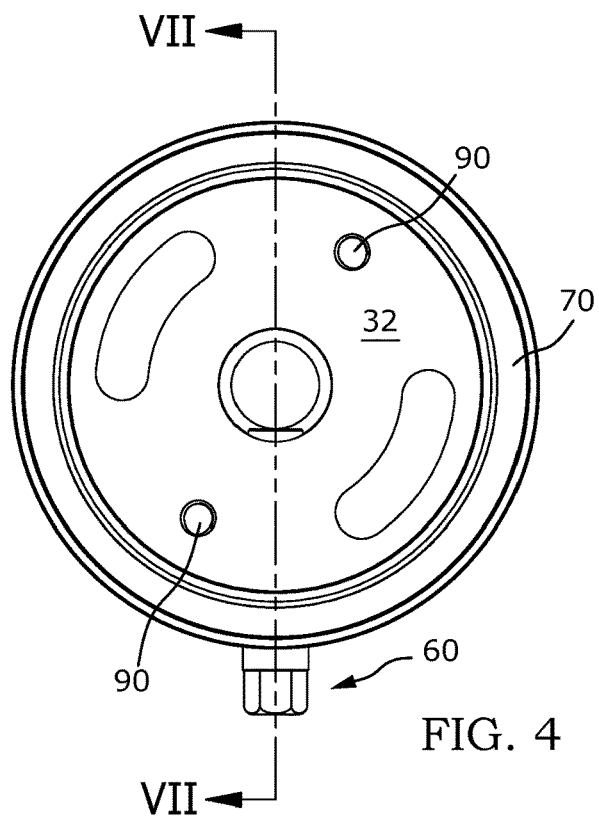
FIG. 4 is a top plan view of the mounting adapter.

LIST OF DRAWING REFERENCE NUMERALS 20 mounting adapter
30 adapter body
32 proximal face
34 distal face
36 channel
38 central bore
40 sidewall
42 through hole
44 internally threaded region
50 nipple
52 nipple end
54 coupling hole
60 camrod
62 coupling end
63 drive end
64 o-ring
66 detent
68 circumferential groove
69 asymmetrical notch
70 gasket
76 release
80 mounting plate
86 mounting plate channels
90 fasteners
92 shaft
94 retaining clip
96 spring
98 gland
99 enlarged face
100 screws
500 oil filter mounting boss
600 oil filter
602 mounting end
604 oil flow apertures

DETAILED DESCRIPTION OF THE INVENTION

Referring initially to FIGS. 1-6, there are illustrated front and rear perspective, bottom and top plan, side elevation, and exploded perspective views, respectively, of an oil filter mounting adapter generally designated as 20. The oil filter mounting adapter, also referred to herein as the mounting adapter or adapter, is used for connecting an oil filter 600 to the oil filter mounting boss 500 of an engine block. This connection is shown diagrammatically in FIG. 5.

Mounting adapter 20 includes an adapter body 30 which has a proximal face 32 and a distal face 34. Proximal face 32 is configured to couple to the oil filter mounting boss 500; for example, the proximal face may threadably engage with the oil filter mounting boss. Mounting adapter 20 has a central bore 38 which is oriented substantially perpendicular to proximal and distal faces 32, 34. A nipple 50 is located within central bore 38, and has a nipple end 52 which extends beyond distal face 34. Nipple end 52 is configured to mate with a mounting end 602 of oil filter 600; for example, nipple end 52 and mounting end 602 may have complementary internal and external threads.

Nipple 50 is slidably positionable within central bore 38 by rotation of a camrod 60 with which the nipple is coupled. Nipple 50 has a coupling hole 54 which receives an eccentric coupling end 62 of the camrod. In use, generally, the oil filter is coupled to nipple end 52 with the nipple in an extended position relative to mounting adapter 20. The camrod is then rotated, which positions the nipple into a retracted position relative to the mounting adapter, and draws the oil filter into contact with the distal face of the mounting adapter. The oil filter may be released by rotating the camrod until the nipple returns to an extended position, and decoupling the filter from the nipple end. In general, with the camrod in the extended position, the oil filter may be decoupled from the nipple by hand (i.e., without the use of a filter wrench or similar tool for increasing torque).

A through hole 42 which is shaped and dimensioned to receive camrod 60 is located in the sidewall 40 of adapter body 30. Through hole 42 has a longitudinal axis ('A' of FIG. 6) which is oriented substantially parallel to proximal and distal faces 32 & 34, and which opens to central bore 38 (see also FIG. 7B). During assembly, camrod 60 is inserted into through hole 42 and eccentric coupling end 62 engages with coupling hole 54 of nipple 50.

Figure 5:
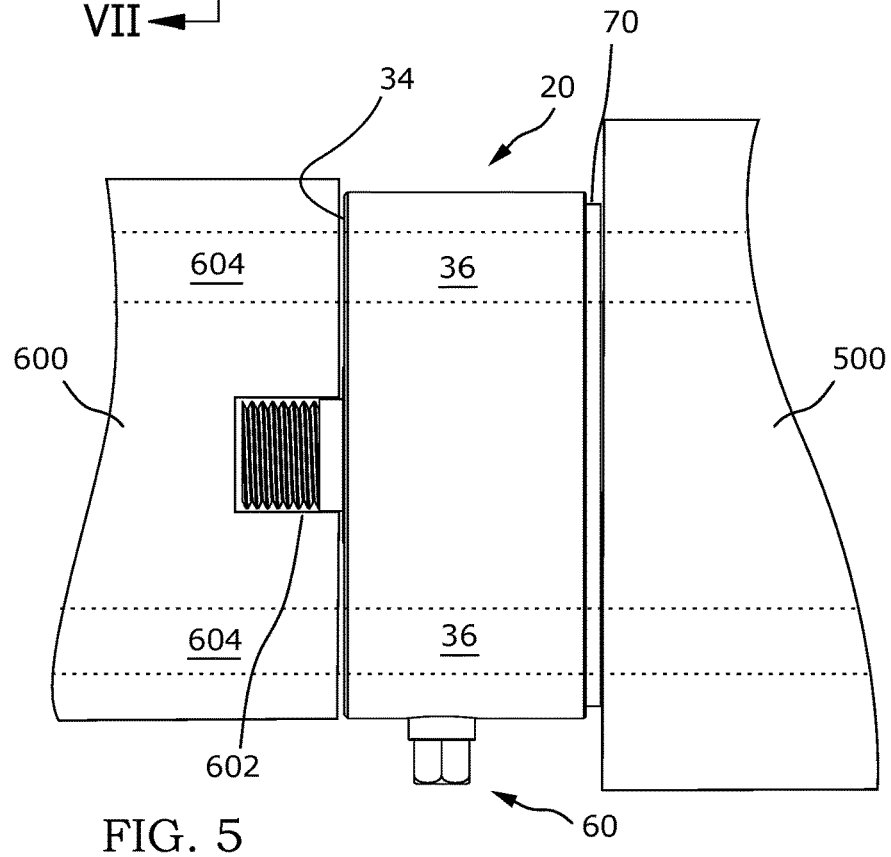
FIG. 5 is a side view of the mounting adapter with cooperating devices.

Adapter body 20 has a plurality of channels 36; two channels are shown in the depicted embodiment, however more channels may be present. Each channel 36 extends between and opens to both proximal face 32 and distal face 34. Channels 36, as indicated by the hidden lines of FIG. 5, are positioned such that oil may flow between the oil filter mounting boss 500 of the engine block, channels 36, and oil flow apertures 604 of oil filter 600.

In embodiments, adapter body 30 is configured to sealingly couple directly to oil filter mounting boss 500. For example, a gasket 70 (FIGS. 1 & 4-6) may be seated within proximal face 32 and configured for compression against oil filter mounting boss 500 when the adapter is installed on the engine block. Gasket 70 prevents oil that flows through channels 36 from leaking out around the interface between adapter 20 and the mounting boss. In an embodiment, gasket 70 may have a width (between inner and outer diameters) of about 0.125 inches.

Installation of mounting adapter 20 on the oil filter mounting boss 500 is accomplished by a coupling interface between proximal face 32 of the mounting adapter and the oil filter mounting boss. In an embodiment, proximal face 32 has an internally threaded region 44 sized for threadable engagement with the oil filter mounting boss. For example, internally threaded region 44 may have an 18 mm diameter and a 1.5 mm thread pitch, or other suitable thread sizes may be used for compatibility with the oil filter mounting boss.

Figure 6:
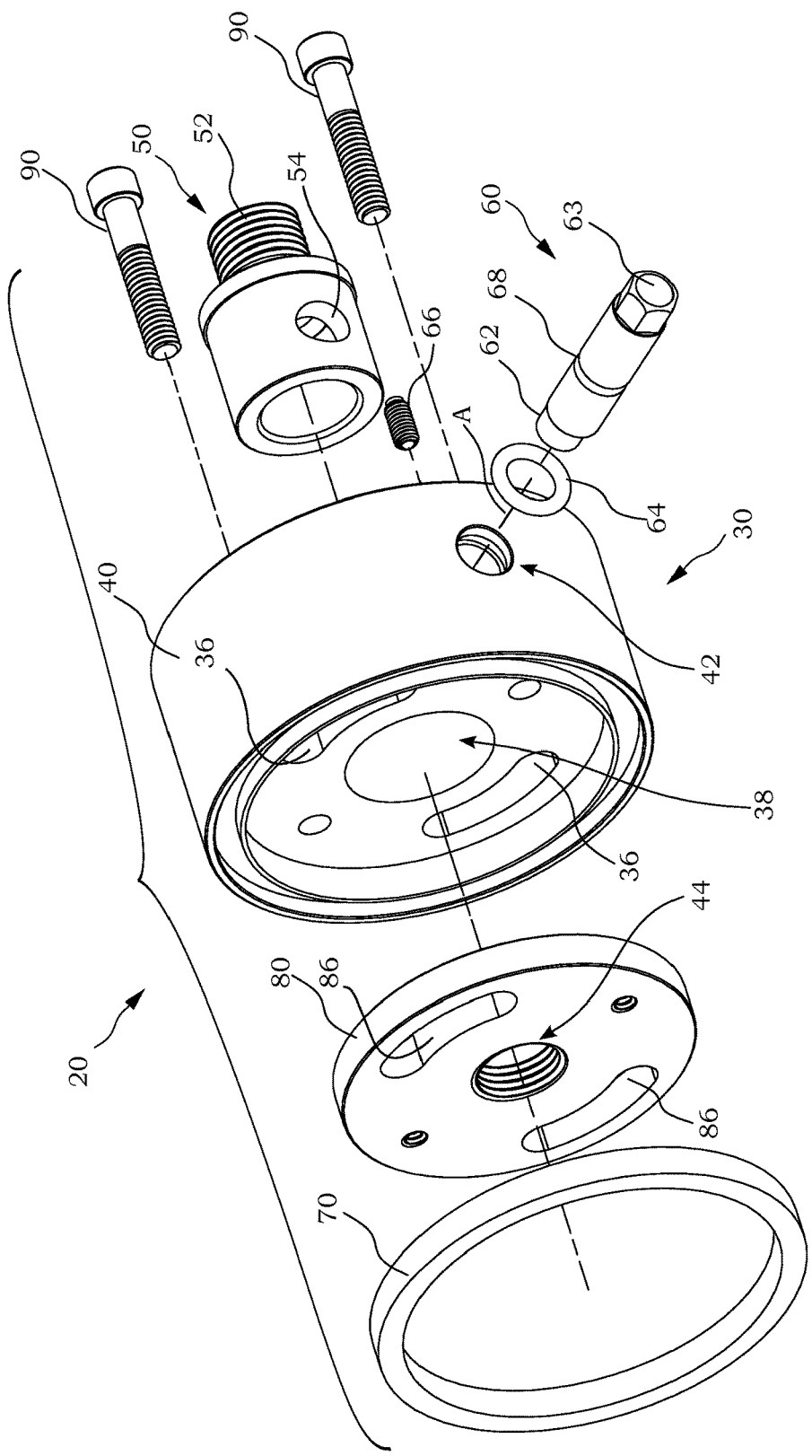
FIG. 6 is an exploded perspective view of the mounting adapter.

In an embodiment, adapter body 20 includes a mounting plate 80 located at proximal face 32 (see FIG. 6). Mounting plate 80 may be configured for coupling to the oil filter mounting boss; for example, internally threaded region 44 may be part of mounting plate 80. Mounting plate 80 is retained within the proximal face, or connectable to the adapter body, by one or more fasteners 90. In the shown embodiment, fasteners 90 are screws and the heads of fasteners 90 may be accessible for loosening or tightening through distal face 34. Mounting plate channels 86 are configured to align with channels 36 and permit fluid communication in the same manner.

The inclusion of a mounting plate 80 is advantageous in that, when installing the adapter on an engine, mounting plate 80 may first be coupled to the oil filter mounting boss.

Fasteners 90 may be partially fastened to loosely couple mounting plate 80 with adapter body 30, before or after mounting plate 80 is coupled to the oil filter mounting boss. The adapter body may then be rotated about threaded region 44 to position a drive end 63 of camrod 60 in an accessible location for the user. Once the adapter body is positioned as desired, fasteners 90 may be tightened, thereby drawing adapter body 30 toward mounting boss 500 until the adapter body is tightly or sealingly coupled to the mounting boss. Mounting adapter 20 may remain thus installed for as long as desired by the user, including for the life of the engine.

In another embodiment, mounting plate 80 may not be present, and threaded region 44 may be machined directly into a proximal face of adapter body 30. This embodiment would not allow for location of the camrod as preferred by the user, but other functionality of the adapter would remain the same.

Figure 7A:
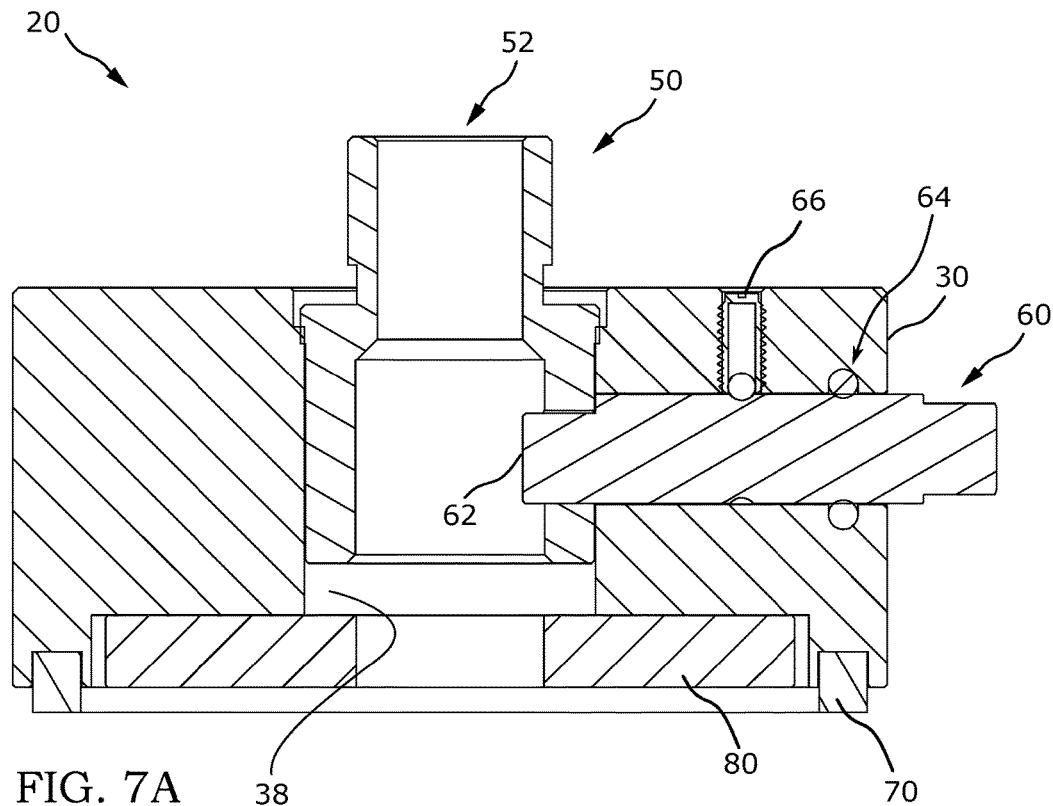
FIG. 7A is an enlarged cross-sectional view along line VII-VII of FIG. 4.
Figure 7B:
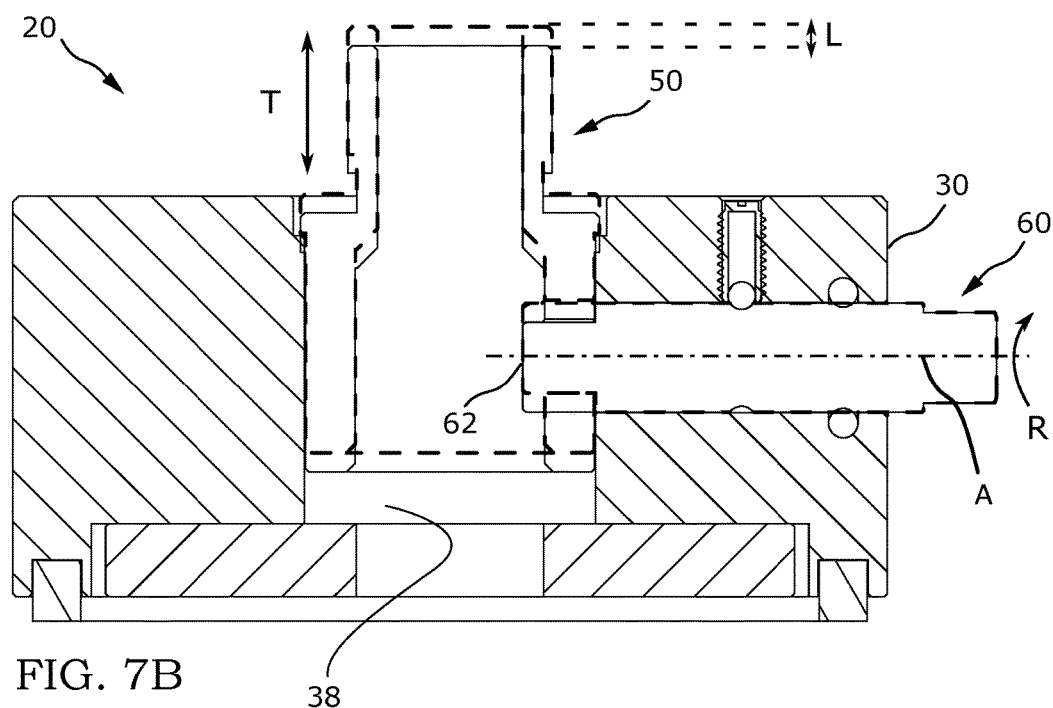
FIG. 7B shows the view of FIG. 7A with elements in alternate positions.

FIG. 7A is an enlarged cross-sectional view along line VII-VII of FIG. 4. FIG. 7B is the view of FIG. 7A, showing camrod 60 and nipple 50 in alternate positions as indicated by the dashed lines (with some hatching removed for clarity). Camrod 60 may be rotated to position nipple 50 in an extended position (dashed line) or retracted position (solid lines) as indicated by the directional arrows labeled T and R. When nipple 50 is in the extended position, the oil filter is preferably coupled to nipple end 52 such that there is some separation or gap between the oil filter 600 and distal face 34 of the adapter body (FIG. 5). This separation may be achieved by mating mounting end 602 of the oil filter with nipple end 52 so that oil filter contacts distal face 34, and then backing off or reversing the engagement by about one quarter of a turn, thereby creating a gap. Then camrod 60 may be rotated to position nipple 50 in the retracted position, which draws the oil filter toward the adapter body and seals it against distal face 34.

In embodiments, nipple end 52 has an external thread configured for threadable engagement with mounting end 602 of the oil filter. For example, nipple end 52 may be threaded with an 18 mm diameter and a 1.5 mm pitch (18 mm×1.5 mm), or other suitable thread sizes may be used for compatibility with cooperating oil filters. By way of example, common oil filter thread sizes are 9/16"×24 tpi, 5/8"×24 tpi, 3/4"×16 tpi, 13/16"×16 tpi, 20 mm×1.5 mm, or 22 mm×1.5 mm.

Figure 8:
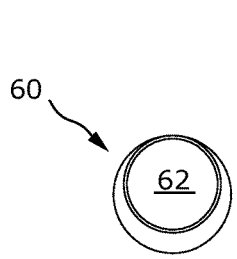
FIG. 8 is an end view of a camrod.
Figure 9:
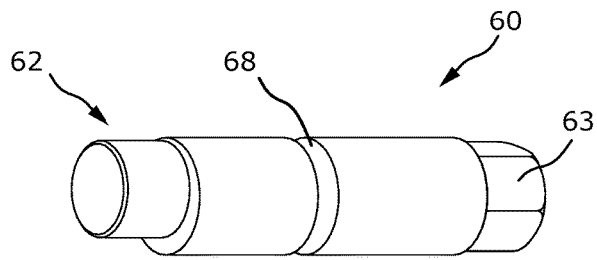
FIG. 9 is a perspective view of the camrod.

FIG. 8 is an end view of eccentric coupling end 62 of an embodiment of camrod 60, and FIG. 9 is a perspective view of the same embodiment. Camrod 60 is generally rotatable about longitudinal axis 'A' of through hole 42 (FIGS. 6 & 7B). Camrod 60 is preferably machined to have a minimal clearance fit with through hole 42; camrod 60 should be able to rotate within through hole 42 when lubricated and when low torque is applied to drive end 63. The fit should not be loose enough to allow easy slippage out of a desired position or excess oil flow around the camrod.

In the embodiment of FIG. 6, an o-ring 64 encircles the camrod and prevents oil from leaking out of adapter body 30 around the camrod. O-ring 64 is located in a gland which is milled in the adapter body, offset internally from sidewall 30 (FIG. 7A). O-ring 64 may be any type of o-ring or gasket suitable for the installation environment; as one example, the o-ring may be made of nitrile rubber and rated for 5000 lbs of pressure. Other suitable types of seal around the camrod may be readily envisioned by those having skill in the art.

In embodiments, drive end 63 of the camrod may have a hex-shaped end configured for rotation by a wrench (FIGS. 6, 9). Drive end 63 may additionally or alternately have a notch suited to be driven by a slotted or Phillips head screwdriver, an internal hex socket, or similar drive coupling arrangement.

In some embodiments a 180 degree rotation of camrod 60 produces a translation, or lift, of nipple 50 equal to about a single thread spacing of the external thread of nipple end 52. The lift created by a 180 degree rotation is indicated as 'L' on FIG. 7B. In other words, when nipple 50 is in the extended position rotating camrod 60 by about 180 degrees will produce a translation of the oil filter toward adapter 20 equivalent to the translation which would be produced by tightening the oil filter by between ¾ and 1 turn about its threaded mounting end in a typical oil filter mounting scenario. For example, an about 180 degree rotation of the camrod may produces a translation of the nipple of about 1/32". The term 'about' as used herein indicates a value within +/−10% of the stated number.

Nipple 50 is generally cylindrically shaped and is preferably machined to have a minimal clearance fit with central bore 38. For example, a clearance of 0.001" or 0.0015" may be present between nipple 50 and central bore 38. The clearance should be sufficient to permit positioning of nipple 50 by the camrod with low resistance, while also minimizing the amount of oil which is permitted to flow between the nipple and the central bore.

Referring again to FIGS. 6 & 9, camrod 60 includes a circumferential groove 68, shown located approximately mid-way between coupling end 62 and drive end 63, but which could be located at any position along the camrod shaft. A detent 66, shown here as a screw with an internal ball under pressure from an internal spring, is configured to engage with circumferential groove 68 and to restrict motion of camrod 60 either rotationally, translationally outward from adapter body 30, or both. A detent 66 of the type shown may be mounted through a threaded hole in the adapter body, such as shown in distal face 34 (FIG. 2). Groove 68 may be of a 'dog bone' type. In addition to resisting motion of the camrod 60, the resistance this type of detent 66 may provide tactile feedback to a user when adjusting the position of camrod 60.

Figure 10:
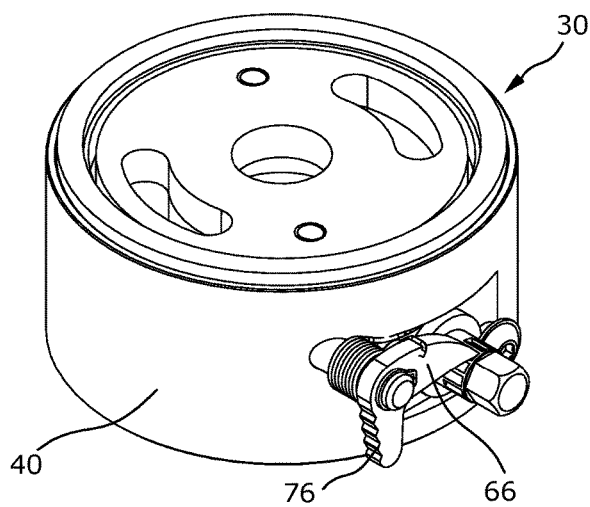
FIG. 10 is a front perspective view of another embodiment of the mounting adapter.
Figure 11:
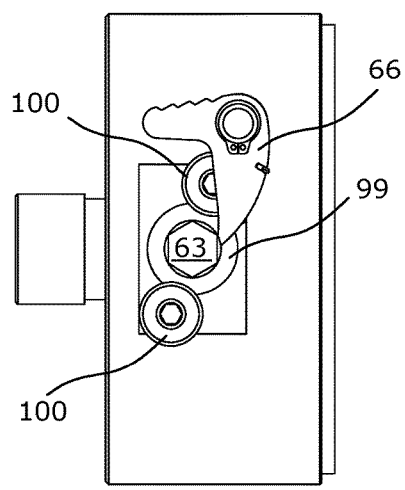
FIG. 11 is a side view of the embodiment of FIG. 10.
Figure 13:
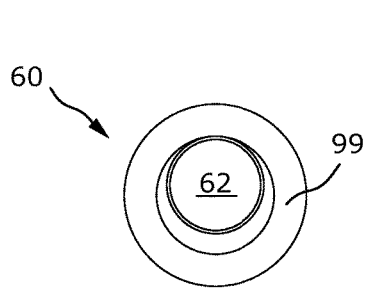
FIG. 13 is an end view of another embodiment of the camrod.
Figure 14:
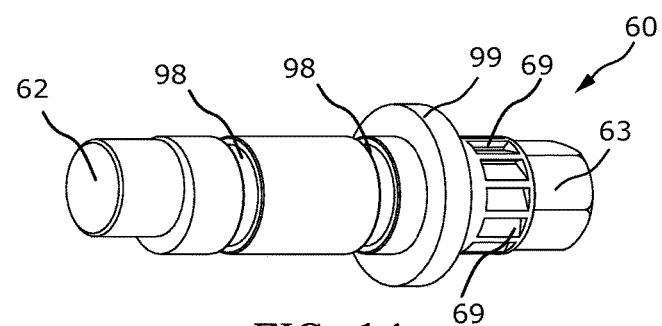
FIG. 14 is a perspective view of the camrod of FIG. 13.
Figure 12:
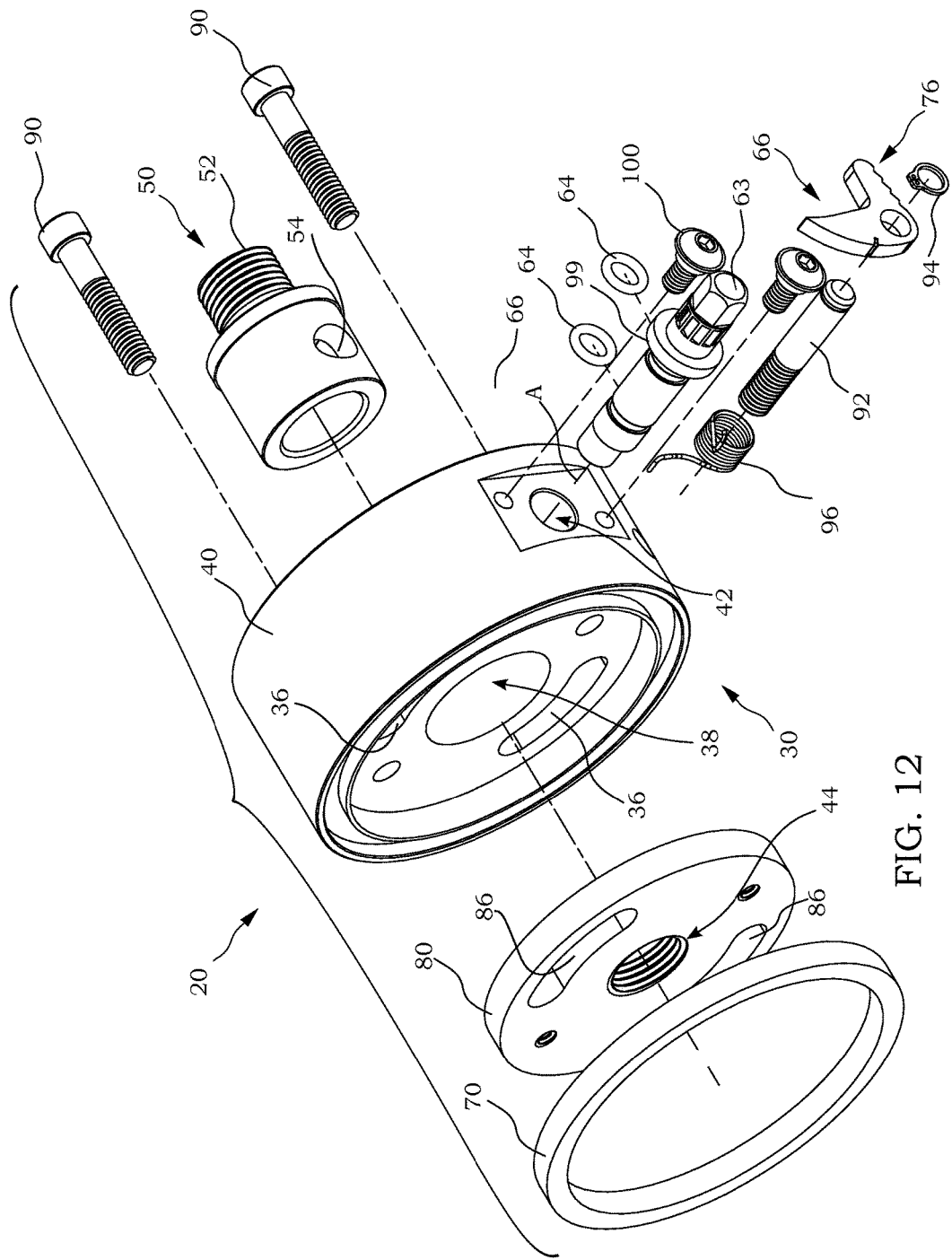
FIG. 12 is an exploded perspective view of the embodiment of FIG. 10.

FIGS. 10-12 are front perspective, side, and exploded perspective views, respectively, of another embodiment of mounting adapter 20, wherein like parts are indicated by like reference numerals. FIGS. 13 & 14 are an end view and a perspective view of the camrod of the FIG. 10 embodiment. A plurality of asymmetrical notches 69 are spaced circumferentially about the camrod. In the shown embodiment, notches 69 are spaced about the entire circumference of the camrod, but they may also cover only a portion of the circumference. Detent 66, a pawl in this embodiment, is mounted to adapter body 30, for example by sliding onto a shaft 92 which is insertable in adapter body 30, and the detent being retained by a retaining clip 94. This detent 66 is configured to engage with one of asymmetrical notches 69, thereby restricting motion of the camrod. Notches 69 are asymmetrical in that they are shaped to permit rotation in one direction but not the other, similar in operation to the teeth of a ratcheting gear.

In one embodiment, detent 66 includes a release 76 located external to sidewall 40 of the adapter body. As shown, release 76 may be a lever with a finger grip, suitable for one-handed operation to release the detent, such as would be desired when removing the oil filter. A spring 96 biases detent 66 toward notches 69, and may be wound against the bias by the action of release lever 76.

The shown embodiment also includes two o-rings 64 mounted in corresponding glands 98 milled in to the camrod.

An enlarged face 99 of the camrod may further restrict the flow of oil out of the adapter body around the camrod. Face 99 may also be used for mounting the camrod to the adapter body, such as with large headed screws 100.

Those having skill in the art will appreciate that the adapter described herein may be mounted in configurations not explicitly shown, and still function in the same manner. For example, the adapter may be offset from the engine block for mounting large filters or where space around the engine is tight. Similarly, an adapter of like construction may be useful in environments and applications other than those described herein.

Further provided is a system, wherein mounting adapter 20 is provided with an oil filter mounting boss for an engine block. Any combination of features or embodiments described herein may be included in such a system.

In terms of use, a method of connecting an oil filter (600), having a plurality of oil flow apertures (604) in a mounting end (602), to an oil filter mounting boss (500) of an engine block, includes:
- (a) providing a mounting adapter (20) including:
  - (i) an adapter body (30) having: a proximal face (32) configured to couple to the oil filter mounting boss; a distal face (34) configured to contact the mounting end of the oil filter; a plurality of channels (36) each extending between and opening to the proximal face and the distal face, and positioned for fluid communication with one of the oil flow apertures; a central bore (38) oriented substantially perpendicular to the proximal and distal faces; and, a sidewall (40);
  - (ii) a nipple (50) located and slidably positionable within the central bore, the nipple having a nipple end (52) configured to extend beyond the distal face of the adapter body and matingly connect to the mounting end of the oil filter;
  - (iii) a camrod (60) having an eccentric coupling end (62);
  - (iv) a through hole (42) in the sidewall of the adapter body, the through hole having a longitudinal axis (A) oriented substantially parallel to the proximal and distal faces and opening to the central bore, the through hole shaped and dimensioned to receive the camrod;
  - (v) a coupling hole (54) in the nipple dimensioned to receive the coupling end of the camrod; and,
  - (vi) the camrod located in the through hole with the coupling end engaged with the coupling hole of the nipple, the camrod rotatable generally about the longitudinal axis of the through hole such that rotation of the camrod produces a translation of the nipple within the central bore;
- (b) coupling the proximal face of the mounting adapter to the oil filter mounting boss;
- (c) rotating the camrod to position the nipple end in an extended position;
- (d) mating the mounting end of the oil filter with the nipple end so that oil filter contacts the distal face of adapter body;
- (e) after (d), positioning the oil filter to create a gap between the filter and the distal face; and,
- (f) after (e), rotating the camrod to position the nipple end in a retracted position, thereby sealing the oil filter against the adapter body.

The above embodiment of a method may further include:
in (a), the mounting adapter further including: a mounting plate (80) located at the proximal face (32) of the adapter body (30) and configured to couple to the oil filter mounting boss (500), the mounting plate being retained by a fastener (90), and the fastener being adjustable through the distal face (34);
in (b), coupling the mounting plate to the oil filter mounting boss;
after (b), locating a drive end (63) of the camrod (60) in an accessible position by rotating the adapter body; and,
then, tightening the fastener thereby drawing the adapter body toward the oil filter mounting boss.

Any one of the above embodiments of a method may further include:
after (f), rotating the camrod (60) to position the nipple end (52) in an extended position; and then,
unscrewing the oil filter (600) from the nipple end.

Any one of the above embodiments of a method may further include:
in (a), the mounting adapter (20) further including: the camrod (60) having a circumferential groove (68); and, a detent (66) mounted in the adapter body (30) and configured to engage with the circumferential groove; and,
after (f), engaging the detent with the circumferential groove, thereby restricting motion of the camrod.

Any one of the above embodiments of a method may further include:
in (a), the mounting adapter (20) further including: a plurality of asymmetrical notches (69) spaced circumferentially about the camrod (60); and, a detent (66) mounted in the adapter body (30) and configured to engage with one of the plurality of asymmetrical notches; and, after (f),
(g) engaging the detent with one of the plurality of asymmetrical notches, thereby restricting motion of the camrod.

The above embodiment of a method may further include:
in (a), the mounting adapter (20) further including: the detent (66) having a release (76) located external to the sidewall (40) of the adapter body (30); and,
after (g), activating the release, thereby enabling motion of the camrod (60).

The embodiments of the oil filter mounting adapter and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the mounting adapter and method should be construed as limiting the invention to a particular embodiment or combination of embodiments. The scope of the invention is defined by the appended claims.

I claim:

1. A mounting adapter for connecting an oil filter having a plurality of oil flow apertures in a mounting end, to an oil filter mounting boss of an engine block, the mounting adapter comprising:
an adapter body having: a proximal face configured to couple to the oil filter mounting boss; a distal face configured to contact the mounting end of the oil filter; a plurality of channels each extending between and opening to the proximal face and the distal face, and positioned for fluid communication with one of the oil flow apertures; a central bore oriented substantially perpendicular to the proximal and distal faces; and, a sidewall;
a nipple located and slidably positionable within the central bore, the nipple having a nipple end configured to extend beyond the distal face of the adapter body and matingly connect to the mounting end of the oil filter;
a camrod having an eccentric coupling end;
a through hole in the sidewall of the adapter body, the through hole having a longitudinal axis oriented substantially parallel to the proximal and distal faces and opening to the central bore, the through hole shaped and dimensioned to receive the camrod;
a coupling hole in the nipple dimensioned to receive the coupling end of the camrod;
the camrod located in the through hole with the coupling end engaged with the coupling hole of the nipple, the camrod rotatable generally about the longitudinal axis of the through hole such that rotation of the camrod produces a translation of the nipple within the central bore.

2. The mounting adapter according to claim 1, wherein:
the adapter body is configured to sealingly couple directly to the oil filter mounting boss.

3. The mounting adapter according to claim 1, wherein:
the adapter body includes a mounting plate located at the proximal face and configured to couple to the oil filter mounting boss, the mounting plate is retained by a fastener, and the fastener is adjustable through the distal face.

4. The mounting adapter according to claim 1, further including:
the proximal face of the adapter body having an internally threaded region configured for threadable engagement with the oil filter mounting boss.

5. The mounting adapter according to claim 1, further including:
the camrod having a circumferential groove;
a detent mounted in the adapter body and configured to engage with the circumferential groove, thereby restricting motion of the camrod.

6. The mounting adapter according to claim 1, further including:
a plurality of asymmetrical notches spaced circumferentially about the camrod;
a detent mounted to the adapter body and configured to engage with one of the plurality of asymmetrical notches, thereby restricting motion of the camrod.

7. The mounting adapter according to claim 6, wherein:
the detent includes a release located external to the sidewall of the adapter body.

8. The mounting adapter according to claim 1, wherein:
the nipple end has an external thread configured for threadable engagement with the mounting end of the oil filter.

9. The mounting adapter according to claim 8, wherein:
a 180 degree rotation of the camrod produces a translation of the nipple equal to about a single thread spacing of the external thread of the nipple end.

10. A system for mounting an oil filter to a cooperating engine block, the system comprising:
an oil filter mounting boss configured for attachment to the engine block;
an mounting adapter configured to sealingly couple directly to the oil filter mounting boss, the mounting adapter having:
an adapter body having: a proximal face configured to couple to the oil filter mounting boss; a distal face configured to contact the mounting end of the oil filter; a plurality of channels each extending between and opening to the proximal face and the distal face, and positioned for fluid communication with one of the oil flow apertures; a central bore oriented substantially perpendicular to the proximal and distal faces; and, a sidewall;
a nipple located and slidably positionable within the central bore, the nipple having a nipple end configured to extend beyond the distal face of the adapter body and matingly connect to the mounting end of the oil filter;
a camrod having an eccentric coupling end;
a through hole in the sidewall of the adapter body, the through hole having a longitudinal axis oriented substantially parallel to the proximal and distal faces and opening to the central bore, the through hole shaped and dimensioned to receive the camrod;
a coupling hole in the nipple dimensioned to receive the coupling end of the camrod;
the camrod located in the through hole with the coupling end engaged with the coupling hole of the nipple, the camrod rotatable generally about the longitudinal axis of the through hole such that rotation of the camrod produces a translation of the nipple within the central bore.

11. The system according to claim 10, wherein:
the nipple end has an external thread configured for threadable engagement with the mounting end of the oil filter.

12. The system according to claim 10, wherein:
a 180 degree rotation of the camrod produces a translation of the nipple equal to about a single thread spacing of the external thread of the nipple end.

13. A method of connecting an oil filter, having a plurality of oil flow apertures in a mounting end, to an oil filter mounting boss of an engine block, the method comprising:
(a) providing a mounting adapter including:
(i) an adapter body having: a proximal face configured to couple to the oil filter mounting boss; a distal face configured to contact the mounting end of the oil filter; a plurality of channels each extending between and opening to the proximal face and the distal face, and positioned for fluid communication with one of the oil flow apertures; a central bore oriented substantially perpendicular to the proximal and distal faces; and, a sidewall;
(ii) a nipple located and slidably positionable within the central bore, the nipple having a nipple end configured to extend beyond the distal face of the adapter body and matingly connect to the mounting end of the oil filter;
(iii) a camrod having an eccentric coupling end;
(iv) a through hole in the sidewall of the adapter body, the through hole having a longitudinal axis oriented substantially parallel to the proximal and distal faces and opening to the central bore, the through hole shaped and dimensioned to receive the camrod;
(v) a coupling hole in the nipple dimensioned to receive the coupling end of the camrod; and,
(vi) the camrod located in the through hole with the coupling end engaged with the coupling hole of the nipple, the camrod rotatable generally about the longitudinal axis of the through hole such that rotation of the camrod produces a translation of the nipple within the central bore;
(b) coupling the proximal face of the mounting adapter to the oil filter mounting boss;
(c) rotating the camrod to position the nipple end in an extended position;

(d) mating the mounting end of the oil filter with the nipple end so that oil filter contacts the distal face of adapter body;

(e) after (d), positioning the oil filter to create a gap between the filter and the distal face; and, (f) after (e), rotating the camrod to position the nipple end in a retracted position, thereby sealing the oil filter against the adapter body.

14. The method according to claim 13, further including:

in (a), the mounting adapter further including: a mounting plate located at the proximal face of the adapter body and configured to couple to the oil filter mounting boss, the mounting plate being retained by a fastener, and the fastener being adjustable through the distal face;

in (b), coupling the mounting plate to the oil filter mounting boss;

after (b), locating a drive end of the camrod in an accessible position by rotating the adapter body; and, then, tightening the fastener thereby drawing the adapter body toward the oil filter mounting boss.

15. The method according to claim 13, further including:

after (f), rotating the camrod to position the nipple end in an extended position; and then, unscrewing the oil filter from the nipple end.

16. The method according to claim 13, further including:

in (a), the mounting adapter further including: the camrod having a circumferential groove; and, a detent mounted in the adapter body and configured to engage with the circumferential groove; and, after (f), engaging the detent with the circumferential groove, thereby restricting motion of the camrod.

17. The method according to claim 13, further including:

in (a), the mounting adapter further including: a plurality of asymmetrical notches spaced circumferentially about the camrod; and, a detent mounted in the adapter body and configured to engage with one of the plurality of asymmetrical notches; and, after (f), (g) engaging the detent with one of the plurality of asymmetrical notches, thereby restricting motion of the camrod.

18. The method according to claim 17, further including:

in (a), the mounting adapter further including: the detent having a release located external to the sidewall of the adapter body; and, after (g), activating the release, thereby enabling motion of the camrod.

\* \* \* \* \*